Aug. 5, 1958  E. HABERKORN  2,846,164
VERTICAL TAKE-OFF AND LANDING AIRCRAFT
Filed Nov. 21, 1956  3 Sheets-Sheet 3
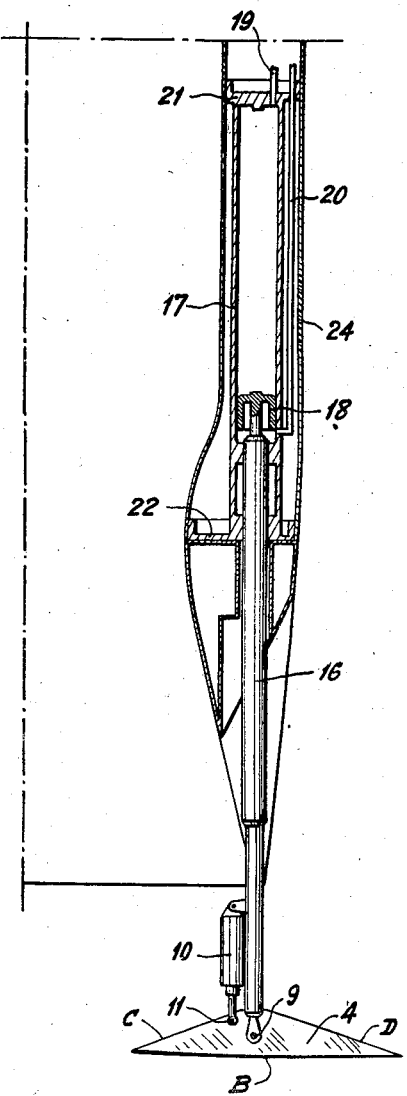
INVENTOR
ERICH HABERKORN
BY
WATSON, COLE, GRINDLE & WATSON

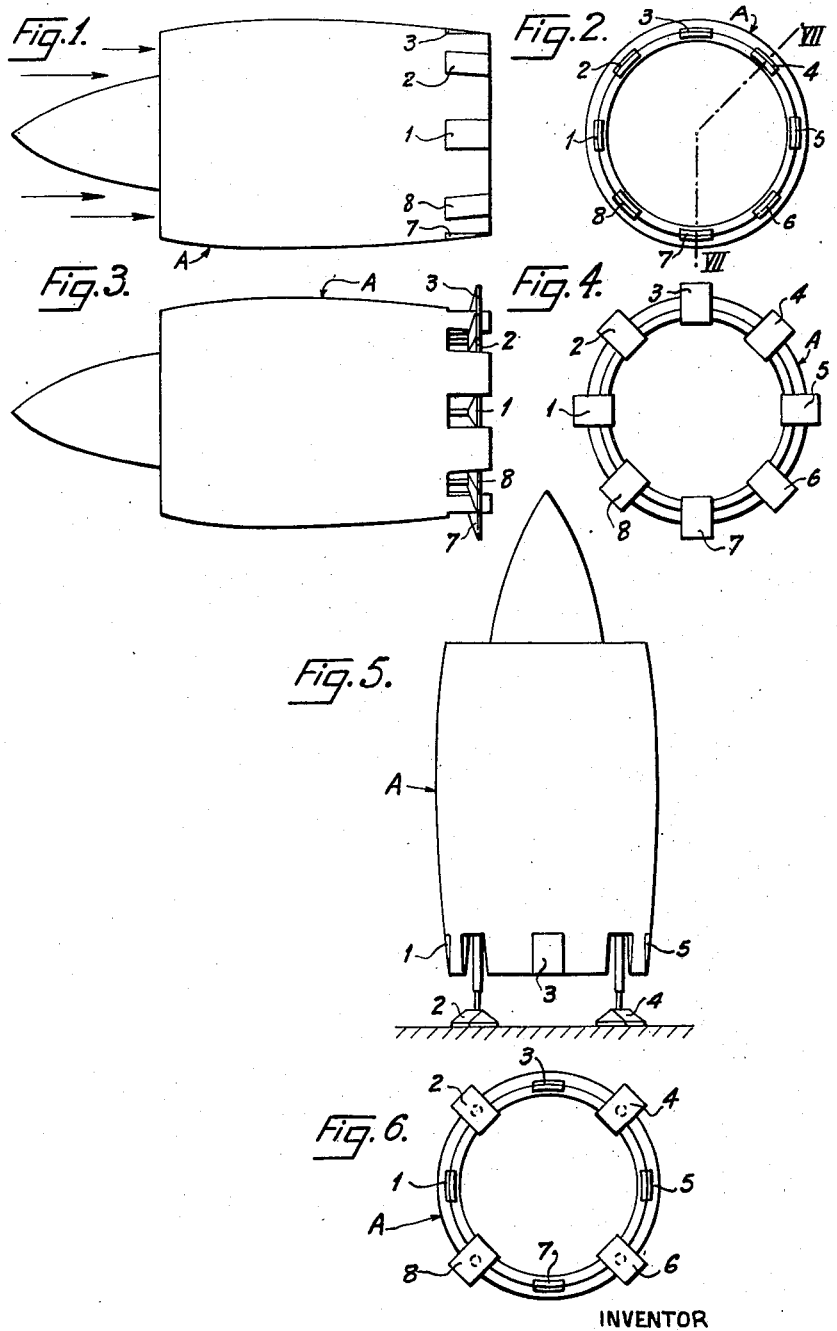

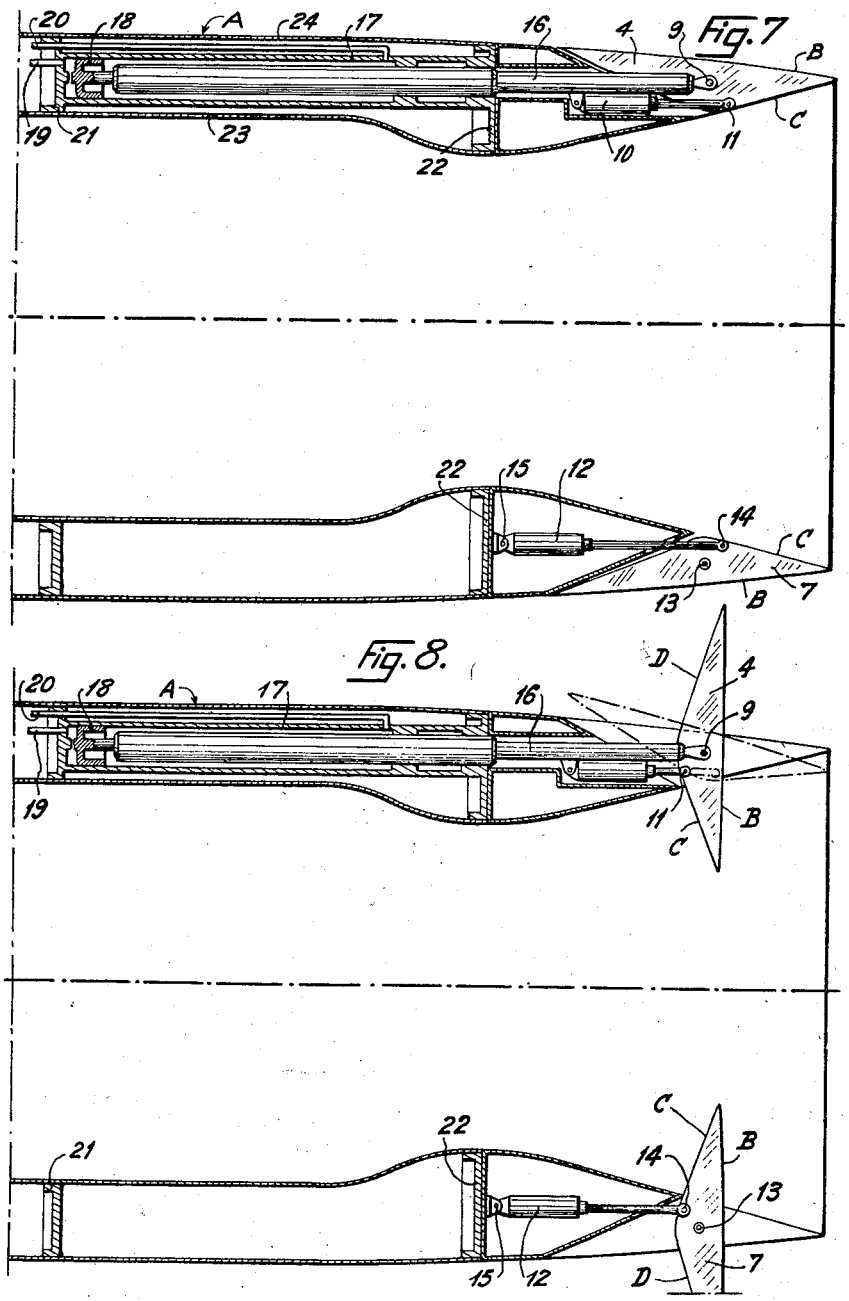

United States Patent Office 2,846,164
Patented Aug. 5, 1958

2,846,164

VERTICAL TAKE-OFF AND LANDING AIRCRAFT

Erich Haberkorn, Dammarie-les-Lys, France, assignor to Societe Nationale d'Etude et de Construction de Moteurs d'Aviation, Paris, France, a French company Application November 21, 1956, Serial No. 623,616

Claims priority, application France November 22, 1955

5 Claims. (Cl. 244—12)

The present invention relates to vertical take-off and landing aircraft and more particularly to annular wing aircraft.

The main object of this invention is to provide such an aircraft with flaps arranged along the trailing edge of the annular wing and merging into the general outline of the wing when in inoperative position, during normal flight. In accordance with the invention, these flaps are pivotally mounted and can be swung to protrude inwardly and outwardly of the annular wing and moreover at least some of the flaps are slidably mounted and can be displaced parallel to the axis of the aircraft so as to constitute feet or stands for supporting the latter on the ground.

Another object of the invention is to provide hydraulic jacks for the simultaneous or selective control of the flaps. Thus, for instance, by simultaneously swinging the flaps into protruding position, an aerodynamic braking action is obtained due to the substantial increase in drag. On the other hand, if only some of the flaps are pivoted in accordance with a dissymmetrical distribution, a steering moment is obtained. Lastly, before landing, at least three symmetrically arranged flaps are lowered while they are retracted flush into the wing after take-off.

Other objects and advantages of the invention will appear in the course of the following description given with reference to the accompanying drawings in which:

Figure 1 is a diagrammatic side view of an annular wing aircraft equipped with an arrangement of flaps in accordance with the invention.

Figure 2 is a rear view of this aircraft.

Figures 3 and 4 are views similar to those of Figs. 1 and 2 respectively, showing the flaps in operative position to produce a braking effect.

Figure 5 is an elevational view of the aircraft resting on the ground.

Figure 6 is a bottom view thereof.

Figure 7 is a sectional view, on a larger scale, taken along the line VII—VII of Figure 2 and showing both types of flaps.

Figure 8 is a similar view showing the flaps in their braking position.

Figure 9 shows a flap which has been displayed and lowered to constitute a support on which the aircraft rests.

The annular wing aircraft A comprises a plurality of flaps (in the illustrated example: eight numbered from 1 to 8) regularly distributed along the trailing edge of the wing and housed in recesses formed in this trailing edge.

At rest, during normal flight, the flaps are faired into the wing and smoothly complete the outline thereof (see Figures 1 and 7). They are shaped to have an outer surface B and an inner surface C flush with the outer and inner surfaces of the annular wing A.

The flap 4 shown at the upper part of Fig. 7 pivots about a hinge 9 and is actuated by means of a double-acting hydraulic jack 10 connected to a point 11 of the flap which is offset relatively to the hinge 9. This jack 10 is thus capable of swinging the flap 4 about the axis 9 to bring it to a protruding position at 90° to its rest position, as illustrated in Fig. 8, or to any intermediate position such as that shown in dot-and-dash line on this figure. The same jack can return the flap to its inoperative position illustrated in Figure 7.

The flap 7 shown at the lower part of Figure 7 is also controlled by means of a double-acting hydraulic jack 12 which causes it to pivot about an axis 13 determined, for instance, by two laterally-disposed ball bearings arranged at a distance from the connection 14 between the rod of the jack 12 and the flap 7.

However, whereas the jack 12 is hinged at 15 to an annular strut 22 of the wing and whereas the pivot 13 of the flap 7 is fast with said wing, the jack 10 of the flap 4 as well as its pivot 9 are carried by a slidable rod 16 actuated by means of a double-acting hydraulic jack 17, a piston of which is shown at 18.

The casing of the jack 17 is secured to the annular struts 21 and 22 of the wing which are themselves riveted to the inner and outer skins 23 and 24. The flap 4 is connected to the telescopic rod 16 through the pivot 9. The jack 10 is carried by the telescopic rod 16 and moves therewith.

When pressure liquid is supplied to the jack 17 through pipe 19, pipe 20 being connected to exhaust, piston 18 moves toward the right of Figures 7 and 8 or toward the bottom of Figure 9. Thus flap 4 is extracted from its housing in the trailing edge of the wing A and is displaced parallel to the axis of the aircraft to reach the position illustrated in Fig. 9.

If, on the other hand, pressure liquid is supplied to pipe 20 while pipe 19 is connected to exhaust, piston 18 moves upward and retracts flap 4 into its housing in the trailing edge of the annular wing. Jack 10 can then be actuated to swing back flap 4 flush with the wing as shown in Figure 7.

In the embodiment illustrated in the drawings, four flaps are both pivotable and movable longitudinally of the aircraft: viz. flaps 2, 4, 6, 8, while flaps 1, 3, 5, 7 are only pivotable.

The flap arrangement which has been described is applicable for several uses:

All the jacks such as 10 and 12 can be simultaneously actuated to control the angular position of the flaps and to cause them to protrude both from the inner and outer surfaces of the wing, as shown in Figures 3, 4 and 8. The flaps then give rise to a substantial increase in drag and hence to an aerodynamic braking effect. Of course, this effect can be made gradual by varying the angular position of the flaps.

The pivots 9 and 13 of the flaps are located at a medial point thereof so that the side D of the flap (see Figure 8) protrudes into the external flow, outside the annular wing, thus creating an important aerodynamic resistance; on the other hand, the side C protrudes into the internal flow through the annular wing, that is to say into the propulsive jet, and creates thus a thrust spoiling effect which is desirable in view of braking the aircraft.

Instead of operating all the flaps simultaneously, they can be separately and selectively controlled in order to produce a dissymmetric action exerting a moment on the aircraft, thereby altering its course.

Thus, by deflecting the flaps 2 and 4 alone, nose-lift is obtained, while deflection of the opposite flaps 6 and 8 alone produces a diving moment. Similarly, deflection of flaps 2—8 or 4—6 will bring about left or right turn of the aircraft.

The same steering action can obviously be achieved by actuating the flaps singly rather than in pairs as described above: flap 3 or 7 produces a pitching moment while flap 1 or 5 a yawing moment.

It is to be noted however that the flaps are liable to have opposite steering effects according as their angular setting is about 90° or a much smaller angle, say 10°. In the former case, they act as brake-flaps in the way described above and cause the aircraft to turn to the same side as the deflected flap or flaps; in the latter case, they act as lifting surfaces or rudders producing a radial force causing the aircraft to turn to the opposite side.

As set forth above, the flaps 2, 4, 6, 8 are adapted not only to pivot, but also to be lowered in order to constitute supports for the aircraft on the ground (see Figures 5, 6 and 9). The flaps are first deflected by means of the jacks 10 whose rod moves in until it comes to abutment, thus rotating the flaps through 90° about pivot. At this moment, piston 18 is subjected to hydraulic pressure through pipe 19 and rod 16 moves out until piston 18 completes its stroke. When the device is in such a state, the annular wing aircraft is ready for landing.

The reverse sequence of operation takes place just after take-off.

What I claim is:

1. In a vertical take-off and landing aircraft having an annular wing, a plurality of flaps distributed along the trailing edge of said annular wing and pivotable to a position wherein said flaps are retracted flush into said swing and to a position wherein said flaps protrude from both the outer and inner surfaces of said wing, and controllable means for displacing at least some of said flaps longitudinally toward the rear of said trailing edge to form supports for said aircraft on the ground.

2. The arrangement of claim 1 wherein the rearwardly displaceable flaps are uniformly distributed along the trailing edge of the annular wing and the number of such flaps is at least three.

3. The arrangement of claim 1 wherein the surface of the rearwardly displaceable flaps which comes flush with the outer surface of the annular wing, is substantially planar, said planar surface facing toward the rear when said flaps are pivoted to protruding position.

4. The arrangement of claim 1 comprising an individual jack for controlling the angular position of each flap, and means for simultaneously and selectively actuating said jacks.

5. The arrangement of claim 4 comprising further jacks for controlling the longitudinal position of the rearwardly displaceable flaps, said further jacks comprising a stationary part fast with the annular wing and a movable part hinged to a rearwardly displaceable flap, the jack controlling the angular position of said flap extending between a point of said movable part and a point of said flap at a distance from the hinge thereof with said movable part.

References Cited in the file of this patent

UNITED STATES PATENTS 2,404,045    Flader _____ July 16, 1946

FOREIGN PATENTS 995,545    France _____ Aug. 22, 1951